United States Patent [19]

Highnote

[11] Patent Number: 4,623,544
[45] Date of Patent: Nov. 18, 1986

[54] CONSTANT TEMPERATURE FRYER/COOKER ASSEMBLY

[76] Inventor: Sidney T. Highnote, Rte. One, Box 91, Rockmart, Ga. 30153

[21] Appl. No.: 637,573

[22] Filed: Aug. 3, 1984

[51] Int. Cl.$^4$ .................. G01N 33/02; A23L 1/00; A47J 37/12
[52] U.S. Cl. .................. 426/233; 99/330; 99/331; 99/403; 99/408; 426/438; 426/523
[58] Field of Search .............. 426/438, 231, 233, 523; 99/403, 407, 408, 409, 330, 331, 342, 337; 210/DIG. 8

[56] References Cited

U.S. PATENT DOCUMENTS

| | | | |
|---|---|---|---|
| 3,210,193 | 10/1965 | Martin | 99/403 |
| 3,410,199 | 11/1968 | Quednau | 99/403 |
| 3,688,683 | 9/1972 | Boggs | 99/330 |
| 3,701,313 | 10/1972 | Boggs | 99/330 |
| 3,750,560 | 8/1973 | Holmes | 99/408 |
| 3,839,951 | 10/1974 | Palmason | 99/330 |
| 3,977,973 | 8/1976 | Anderson | 210/167 |
| 4,084,492 | 4/1978 | Sullivan | 99/330 |
| 4,324,173 | 4/1982 | Moore et al. | 99/331 |

Primary Examiner—George Yeung
Attorney, Agent, or Firm—Kimmel, Crowell & Weaver

[57] ABSTRACT

A fryer/cooker assembly for cooking fast foods and the like at a predetermined constant temperature and without contamination between various types of food products includes a kitchen cabinet assembly having a cooking pan at an upper portion thereof which is removable for cleaning. The cooking pan is provided with a dispersing pipe substantially around the complete inner circumference thereof. This pipe has a plurality of oil dispersing holes, each hole being at approximately 30° to the cooking pan bottom. A baffle plate over the dispersing pipe provides a gap between the lower edge thereof and the cooking pan bottom of approximately ¼ inch.

A heater/heat exchange unit of high efficiency, high temperature output receives, through appropriate piping, cooking oil to be heated to a desired set temperature. Temperature probes in the pan and the oil input to the heater/heat exchanger coupled with thermostat control structure accurately maintain the temperature of the cooking oil at preferably 325° during operation of the assembly.

Further important structure includes a bypass type oil filtering structure, a static pipe oil flow structure at each of the ends of the dispersing pipe, removable components for each of cleaning, easy access doors for appropriate components, and all mounted in a stainless steel cabinet for nice appearance, cleanliness and ease of maintenance.

42 Claims, 14 Drawing Figures

CONSTANT TEMPERATURE FRYER/COOKER ASSEMBLY

BACKGROUND OF THE INVENTION

1. Field of the Invention

This invention relates generally to devices for cooking fast food type items such as french fries, chicken, fish and the like.

2. Description of the Prior Art

A common problem with known devices for cooking fast food products is that the cooking pan containing the heated oil and the associated structure therewith fails to maintain the temperature of the cooking oil at a constant value during the cooking process. That is, when a batch of cold product to be cooked is put into the heated cooking oil, a substantial temperature drop generally occurs. This, of course, is highly undesirable.

Another problem with known devices is that if various types of products such as fish, chicken and/or french fries are cooked simultaneously, or even sequentially, the oil tends to convey the flavor of one to the other. This, again, is highly undesirable.

Another problem of known fast food cookers is that they are not readily disassembled for cleaning during necessary shutdown periods thereof.

Existing prior patents which may be pertinent to the present invention are as follows:
U.S. Pat. No. 4,084,492—Sullivan
U.S. Pat. No. 3,977,973—Anderson
U.S. Pat. No. 3,839,951—Palmason
U.S. Pat. No. 3,750,560—Holmes
U.S. Pat. No. 3,701,313—Boggs
U.S. Pat. No. 3,410,199—Quednau The Sullivan patent discloses a continuous flow system including a separate cooking chamber, a separate oil storage chamber, means for pumping the cooking oil through the system, and filter means and heating means which are outside of the cooking receptacle. However, this device is for controlling the level of the cooking oil in the cooking vessel, rather than for controlling the constant temperature thereof.

The Anderson patent shows a fry kettle with an integral continuous filter in which the cooking oil is pumped through the filter and discharged into the frying kettle through nozzles 53, following which it flows downwardly into an oil storage compartment having a heating element submerged in the oil. Contaminants such as crumbs and the like are separated from the cooking oil by continuously drawing off a small portion of the oil from the storage compartment through an opening in the crosswall into an integral filter compartment where the oil passes through openings into a crumb catcher which is carried by a removable frame. However, the filtering structure of this device is substantially different from that of the present invention.

The patent to Palmason shows the discharge of cooking oil through conduits along the sides of two cooking chambers, the purpose of this being to cause turbulence in the oil so as to promote better cooking. A central overflow means is also provided for maintaining the level of the cooking oil at a desired point. However, this device does not teach the important concept of the present invention of maintaining the cooking oil at a very precise constant temperature, and the required support structure for doing so.

The Holmes patent shows circulation of a cooking oil within a cooking receptacle by injecting it through nozzles on one wall of the cooking pot which will result in turbulence, and thus more even cooking temperatures. However, the precise structure for controlling oil temperature and the oil dispersing means of the present invention are lacking.

The Boggs patent teaches the use of nozzles that create turbulence in the cooking pot, filtration of the cooking oil, and heating outside of the cooking pot. Again, this patent does not teach the important features of the present invention.

The Quednau patent shows a deep fat fryer with automatic filtration and storage means for the oil. While this structure somewhat resembles that of the present invention, many of the important features are lacking.

None of the known prior art devices offers the new and novel features of the present invention.

SUMMARY OF THE INVENTION

An object of the present invention is to provide a constant temperature fryer/cooker assembly wherein the cooking oil will be maintained at a precise constant temperature during the entire cooking process, even though additional new cold products are added during the process.

Another object of the present invention is to provide a fast food cooker assembly which will have sufficient filtration of contaminants and pieces of food particles to prevent transfer of food taste from one type of product to another.

A further object of the present invention is to provide a cooking device which will very quickly and very efficiently heat up and maintain a constant temperature of cooking oil for various fast food type products. An easily cleanable assembly after shutdown is also provided for.

A still further object of the present invention is to provide a cooking oil assembly having a high efficiency constant temperature heating structure, a bypass filtration structure wherein only a portion of the oil is filtered during each cycle thereof, pump means for effecting oil flow, cooking tray structure which can be easily cleaned, and dispersing pipe and baffle means associated therewith for efficiently effecting heated oil flow with substantially complete elmination of any cold spots therein.

The present invention offers a number of new and novel features over the known prior art.

This cooker provides a system which will hold oil at a constant temperature with little fluctuation due to cold products being added. Another feature is to filter oil continuously to provide an oil that is clean of particles and food acids, so as not to transfer food taste between products being cooked. A third feature is to provide a cooker which is easy to operate, maintain and clean.

The cooker is equipped with a heater/heat exchange structure which is designed to to 90% efficient. With this kind of efficiency, the cooking oil can be held at a constant temperature. The oil is constantly heing pumped from a holding tank through the heat exchanger into the cooking pan. This circulation, coupled with the novel arrangement of oil dispersement pipe and baffle, causes the oil to flow more evenly across the product and also removes any cold zone from around the product, which facilitates faster cooking.

The cooker is equipped with a filter system which is continuous and has easy access to a small micron removal disposable filter bag. This system provides for easy clean up at the end of the day and also extends the life of the oil and prevents transfer of food product taste.

The fryer unit is simple to operate. The frying temperature is preset at the thermostat from 325-350 degrees. The operator needs only to turn "on" the master switch, the pump switch, and the heater/heat exchanger switch. The unit is completely ready for cooking in about 7 minutes. The system holds about 30 gallons of oil at the 325-350 degree temperature continously. After the cooking period is over, the three switches are cut off and the oil drains automatically into the holding tank. The cooking tank and filter are cleaned and changed the next morning when the unit has cooled down.

The entire system is very simple. The cooking tank holds 3 inches of oil overflowing into a pickup tank circulating by pump to the heater/heat exchanger back into the cooking tank, and the cycle is continued. Only 30% of the oil is filtered on each cycle, which prevents blinding of the heat exchanger.

Important features of this invention are the pipe baffling system, the removable bottom for the cooking tank, and the filtering system which filters about 30% of the oil on each cycle.

The design of the overflow system, cooking and holding tanks are also further important features of this invention.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
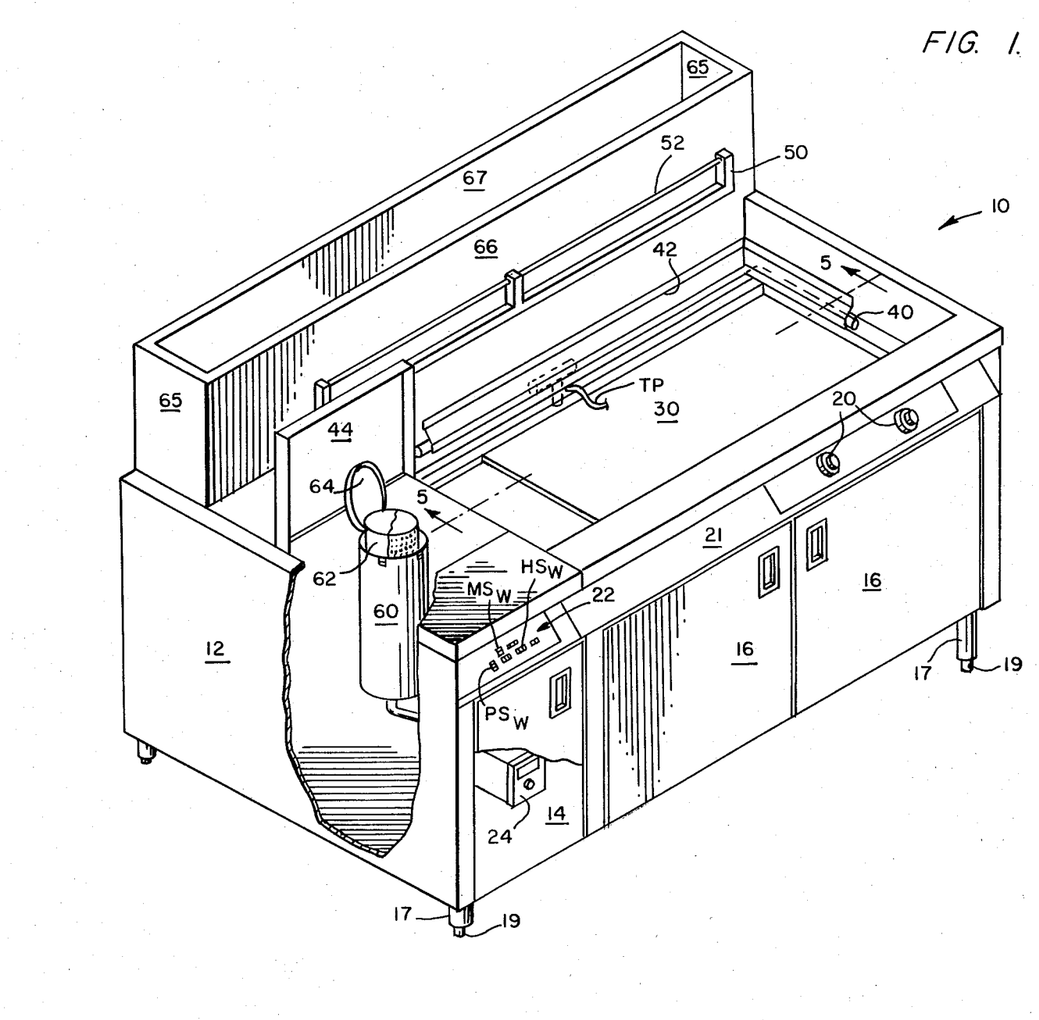
FIG. 1 is a perspective view of the fryer/cooker assembly of the present invention.
Figure 2:
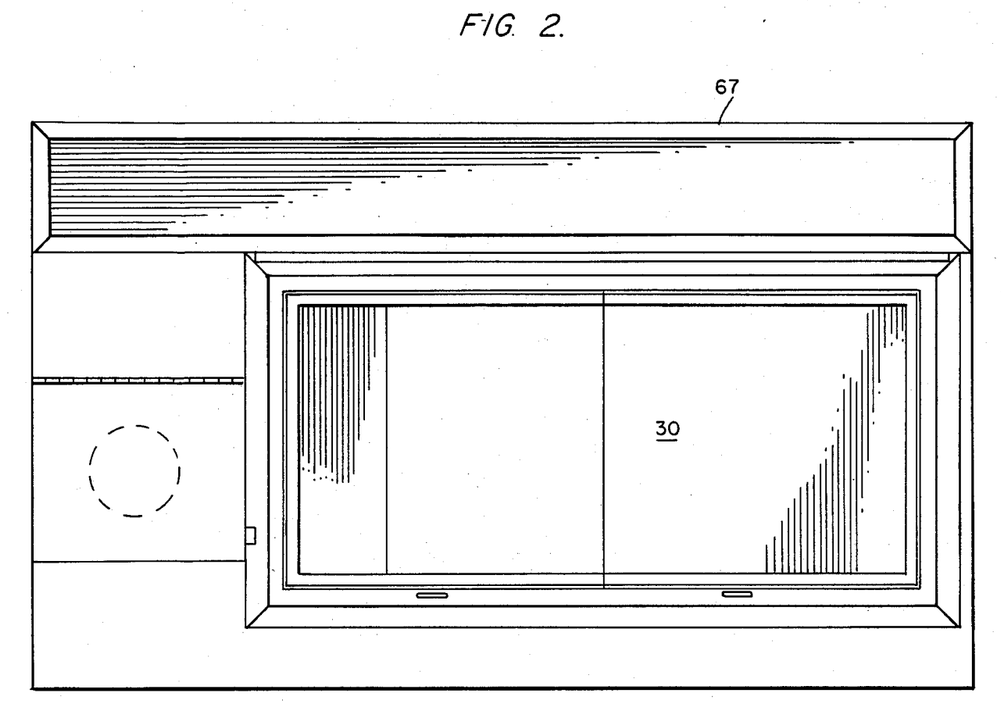
FIG. 2 is a top plan view of the fryer/cooker assembly of FIG. 1.

Referring to FIG. 1 of the drawings, reference numeral 10 indicates in general the assembly of the present invention. A cabinet housing having sides 12, a front door 14 for access to an adjustable thermostat structure 24, and a pair of equal sized front doors 16 for access to the internal pump and heater structure of the device are provided. Each corner of the cabinet is appropriately provided with legs 17 having adjusting portions 19 therewith. Cooking timer control knobs 20 are appropriately provided on a front sloping portion 21 of the cabinet, as well as operating and control switches 22.

In the upper middle portion of the cabinet is provided a cooking oil pan 30 which normally contains the heated oil and the products being cooked therein. Around the inside periphery of the cooking pan 30 is provided an oil dispersing pipe 40 and an oil flow baffle 42. At the left end as viewed in FIG. 1 of the cabinet is a hinged top lid 44 which normally covers a cooking oil filter 60. This filter 60 is provided with a removable filter element 62 and a cover 64. At the rear of the cabinet is a vertical standpipe structure having end walls 65 and front and back walls 66, 67. Upon front wall 66 is provided a bracket 50 having a support rod 52 supported thereby. This structure is for the purpose of holding cooking or frying racks of wire grid construction for permitting excess oil on a cooked product to drop back into the cooking pan 30.

Figure 3:
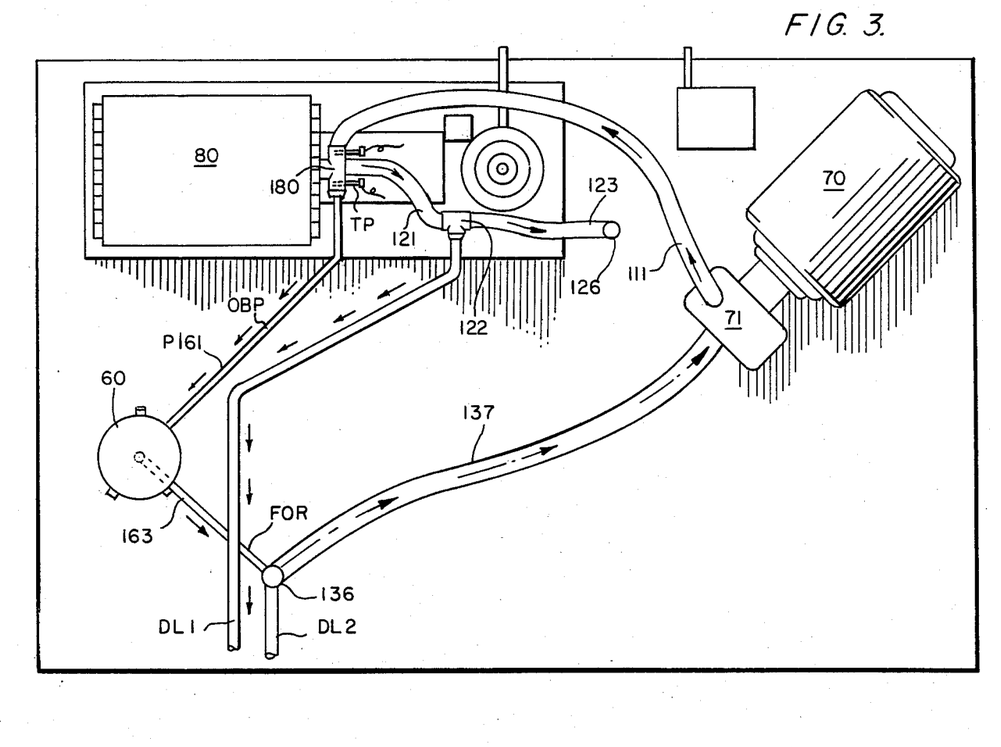
FIG. 3 is an inside top plan view of the assembly with the upper portion thereof omitted.
Figure 4:
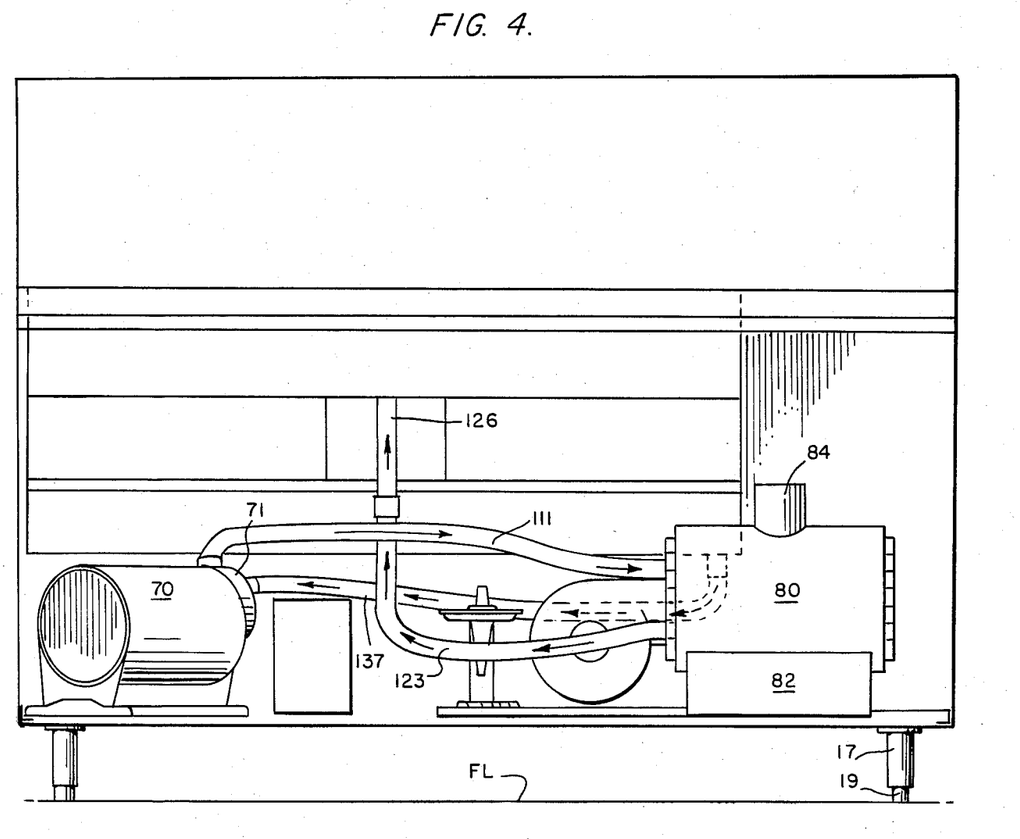
FIG. 4 is an elevational view inside the fryer/cooker assembly showing the oil pump heater and heat exchange structure, and interconnecting piping therefor.
Figure 7:
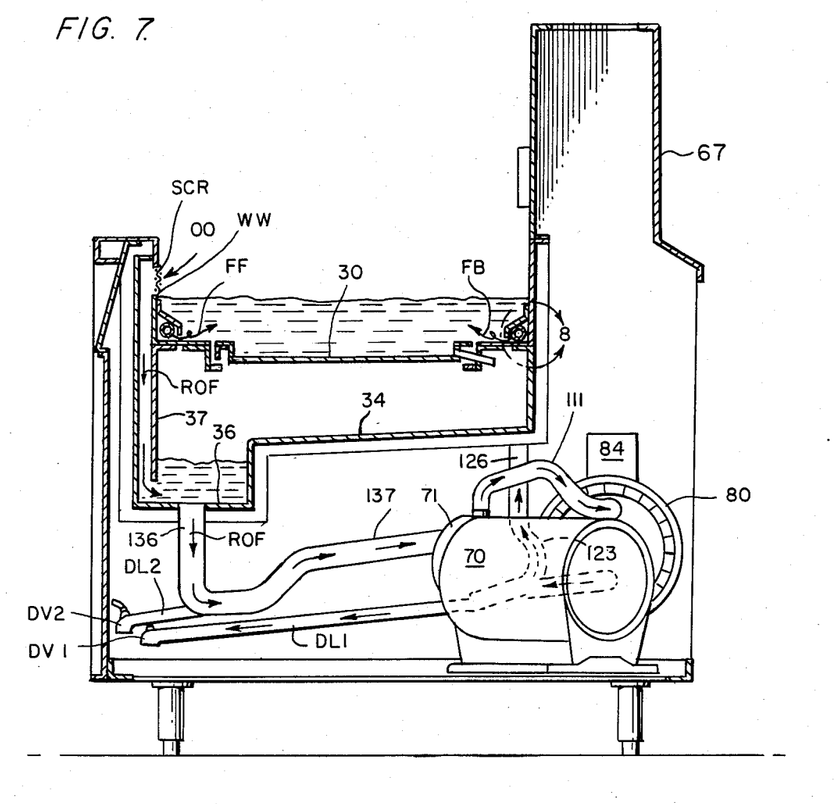
FIG. 7 is a side elevational view, partly in cross-section, taken approximately mid-way of the apparatus of FIG. 1.

As best seen in FIGS. 3, 4 and 7, a pump motor 70 drives a centrifugal type oil pump 71 for effecting flow of the cooking oil through the system. An output pipe 111 connects between the output of the pump 71 and the input Tee 180 for the heater/heat exchanger 80. The Tee 180 is preferably provided with temperature probes TP on each side of the stem input to the heat exchanger 80. These probes, as described below, function in the very precise control of the temperature of the cooking oil. The heater/heat exchanger 80 is a very high efficiency, gas operated fluid heater. Preferably, the equipment known as RADARLINE, provided by the Raytheon Company, such as the Mark 3000 Thermal Fluid Heater, is used. This equipment in actual tests is remarkably efficient and is highly recommended.

The output of heated oil flows through piping 121 to a Tee 122, and then through piping 123 to the cooking oil T-manifold 43, 44. A drain line DL1 is also preferably connected to the Tee 122 to permit easy and quick draining of the oil when necessary. As best seen in FIG. 7, a drain valve DV1 is close to the front doors 16 of the cabinet for easy access by an operator of the equipment. Also, from the input Tee 180 to the heat exchanger, an oil bypass line OBP is normally provided for a constant flow during operation of a small portion of the oil through the filter 60. From the filter 60, an oil return line 163 is connected to a sump pipe 136. The sump pipe 136 is connected to an outlet aperture at the bottom center of the sump 36 below the cooking pan 30. The sump 36 only takes up a small portion of the cabinet assembly, and has a raised floor 34 which forms the holding tank for oil storage when pump 71 is off. A front partition wall 37 for the sump extends upwardly at the front thereof to form a wier WW for oil level overflow OO at the top thereof. The top opening OO is covered by a 3/16" screen mesh to prevent large particles from passing into the pick-up sump 36.

Figure 5:
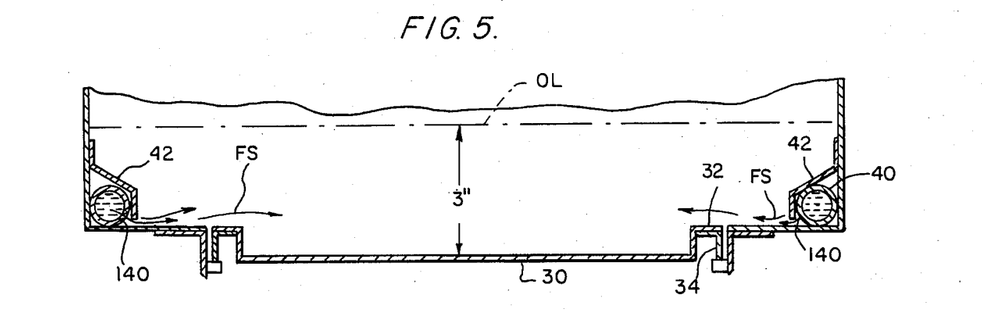
FIG. 5 is a cross-sectional view taken along line 5—5 of FIG. 1.

As best seen in FIG. 7, the heated cooking oil under pressure flows from the back FB and from the front FF with swirling and turbulence to effect the desired efficient cooking action of the main body of cooking oil within pan 30. Side dispersing portions (FIG. 5) of the pipe 40, as well as side baffles 42, provide for entry and input of the heated cooking oil for 360° around the inside of the cooking pan perimeter.

Figure 6:
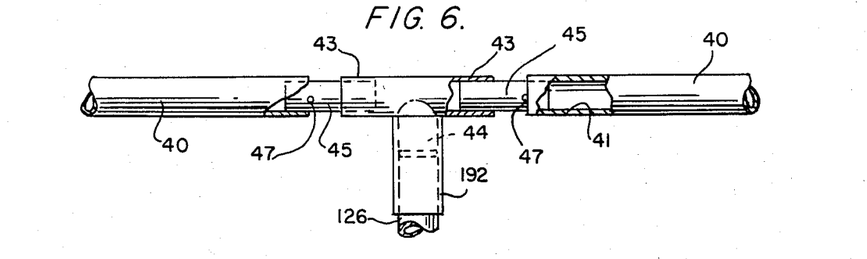
FIG. 6 is a fragmentary portion showing the manifold T connection, partly in cross-section.
Figure 9:
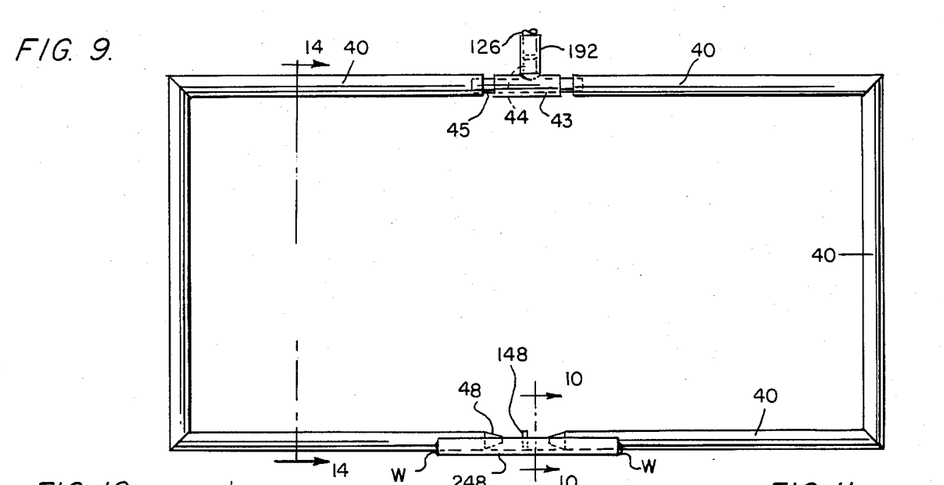
FIG. 9 is a top plan view showing the dispersement pipe and manifold T connection structure.
Figure 13:
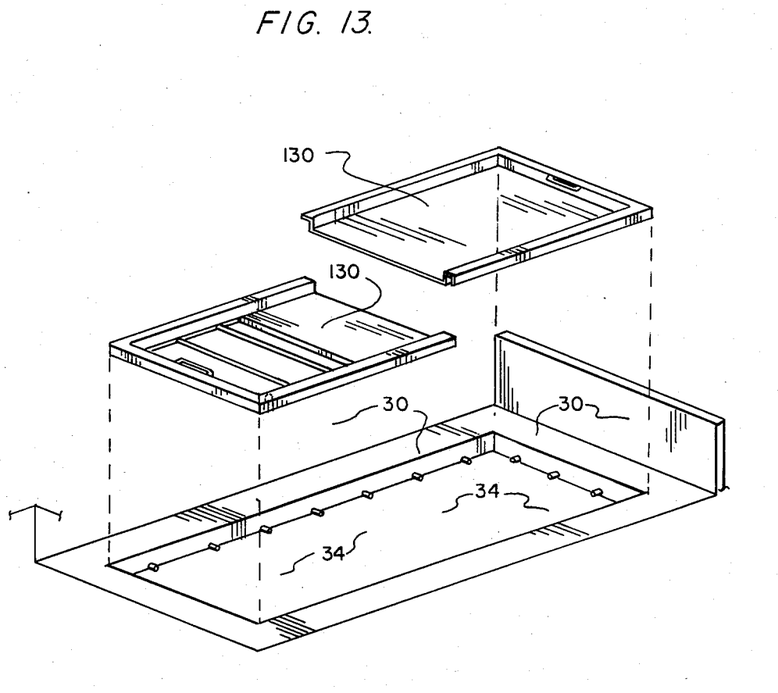
FIG. 13 is an enlargement of a removable pan located in the cooking tank.
Figure 14:
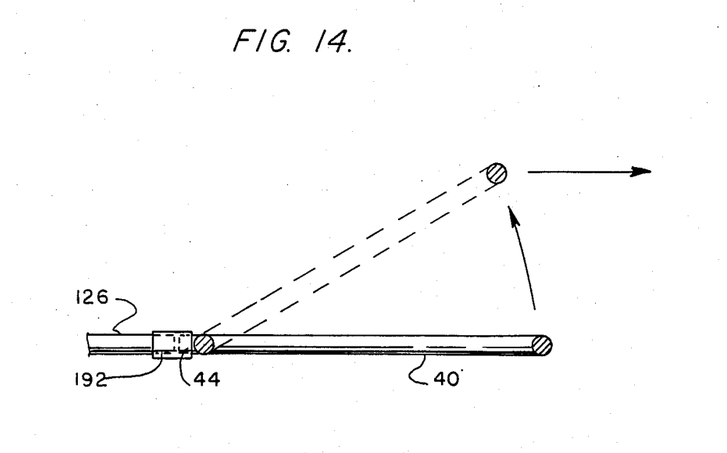
FIG. 14 is a sectional through the dispersement pipe and T-manifold in relation to it being removed from the cooking pan.

As best seen in FIG. 9, the oil dispersing pipe 40 comprises substantially a rectangle, with the back portion thereof connecting to the T-manifold 43, 44. As best seen in the enlarged view of FIG. 6, the T-manifold 43, 44 has insert stubs 45 in the respective ends 43 thereof for slidable engagement with the insides 41 of the respective ends of the dispersing pipe 40. Pins 47 prevent the movement of the slidable stubs 45 too far into the pipe 40 ends, and also prevent disengagement of the inner ends of the stubs from the portions 43 of the T-manifold. The T-manifold is also designed to swivel and plug into coupling 192 on the end of supply pipe 126 so the entire pipe can be raised and removed from tank 30 for cleaning, per FIG. 13.

Figure 8:
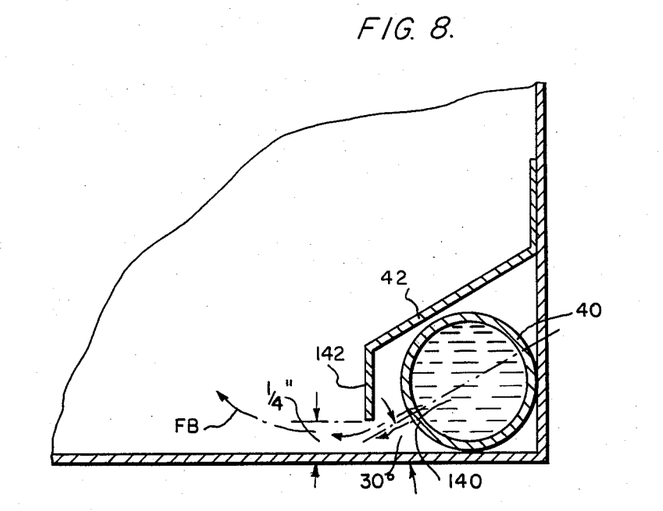
FIG. 8 is an enlarged fragmentary corner portion of the encircled area 8 of FIG. 7.

As best seen in the enlarged view of FIG. 8, the dispersing pipe 40 is provided with spaced apertures 140 therein. These apertures are spaced approximately one inch on center completely around the piping 40. As shown, the preferred central axis of each aperture is at an angle of 30° from the horizontal. This is very important for the proper flow of heated cooking oil having the maximum amount of turbulence into the cooking pan.

Also, it has been discovered by the inventor that the swirling and turbulent effect of the oil flow through the plurality of apertures 140 is further substantially increased by providing a baffle 42 with depending flange 142 thereon as shown in enlarged detail in FIG. 8. A small gap between the lower edge of baffle 142 and the bottom surface of the cooking pan 30 is provided for the oil to flow through. Preferably, this gap is approximately ¼ inch. Both the angle of 30 degrees of the axis of the dispersing holes and the baffle gap opening of ¼ inch have been found, through actual tests, to be preferred. However, slight variations from these preferred angle/gap openings can be utilized still with fairly good results.

From the bottom of the sump discharge stub 136, an oil return pipe 137 feeds the cooking oil back to the input of the pump 71. Also, a drain line DL2 appropriately feeds from the bottom of sump pipe 136 to the front of the cabinet to a drain valve DV2, again for the purpose of permitting easy access by an operator for draining the oil when desired during cleanup operations.

Figures 10, 11, 12:
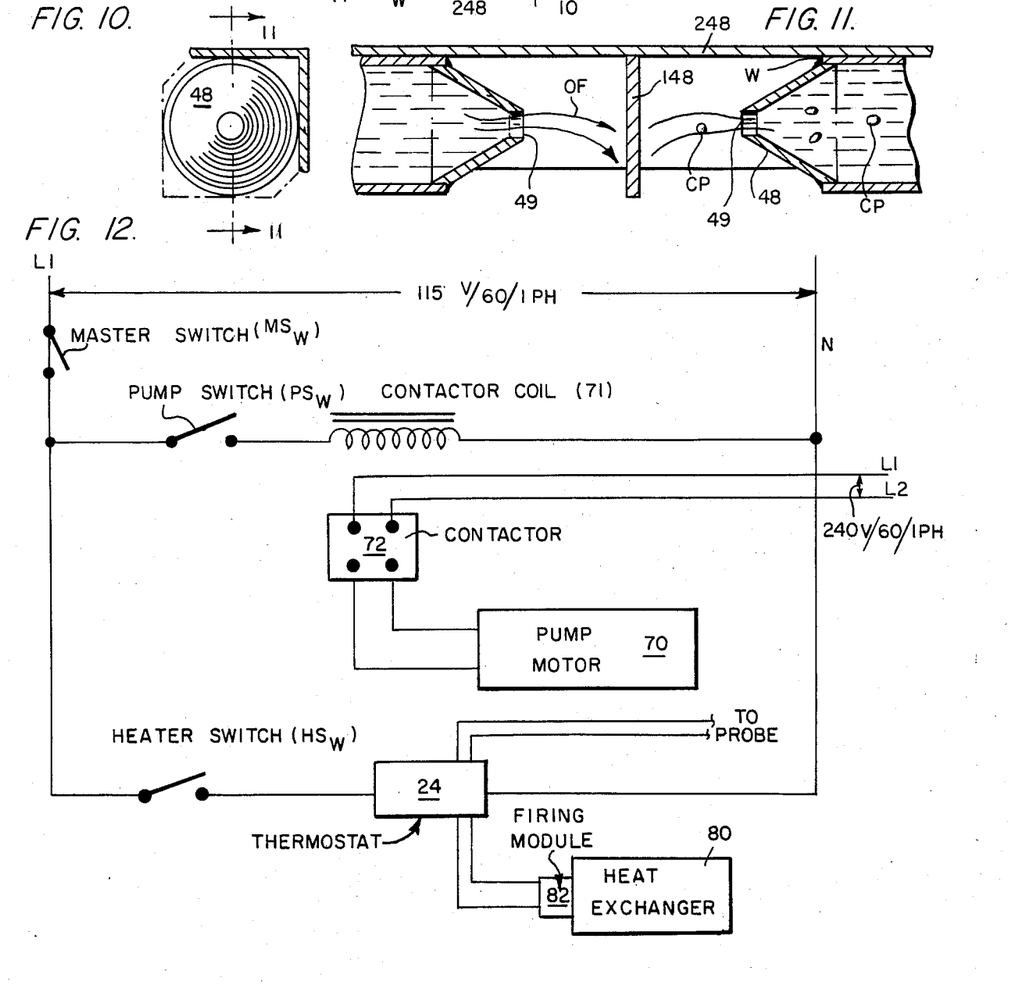
FIG. 10 is an end view of the dispersement pipe static end taken along line 10—10 of FIG. 9.
FIG. 11 is an enlarged cross-section taken along line 11—11 of FIG. 10.
FIG. 12 is an electrical schematic of the wiring for the present invention.

Another important feature of the present invention is the provision of a clog eliminating and pipe clearing structure at each of the normally static ends of the dispersing pipe 40 at the front of the device. This structure is best seen in FIGS. 9, 10 and 11. Each normally static end of the dispersing pipe 40 is provided with a conical tip 48 having an opening 49 therein. The purpose of this is so that a small oil flow OF will continually flow from the respective normally closed end of the pipe 40. Thus, any contaminant particles CP which may be in the oil, instead of building up and clogging the respective ends, will flow out openings 49 into the cooking pan for eventual removal by the filter structure. In order to support the respective modified ends of the pipe 40, an angle iron 248 is welded W to the respective ends. Also, a diverter plate 148 is welded at right angles to the angle iron 248 for causing the oil flow OF from each modified end to go directly out towards the center of the cooking pan.

Preferably, a temperature probe TP for sensing the temperature of the heated oil is provided which extends into the cooking pan near the T-manifold as best seen in FIG. 1. This probe TP, along with the probes TP for the heat exchange input 180, are all appropriately connected to the thermostat 24.

FIG. 12 shows a schematic of the electrical wiring of this assembly. A master switch MS is connected to one side of a 240 volt power line L1, L2, with a neutral line N. When the master switch is turned on, input power is supplied for both the pump and the heater. A pump switch PSW appropriately actuates the coil contactor 71 for the 240 volt contactor switch 72 for the pump motor 70. Of course, when energized, the pump motor drives the centrifugal pump 71 affixed thereto. The heater switch HS in turn energizes the electrical circuitry for thermostat 24 with suitable wiring connected to the temperature probes and a 110 volt energization circuit for firing module 82 of the gas burner for the heat exchanger 80.

It has been discovered that, by the use of this arrangement, and with a precision thermostat control 24 and the appropriate temperature probes TP, the cooking oil temperature can be maintained within plus or minus 1° of the preferred cooking oil temperature of 325°. Even when a batch of cold new product is added to the cooking oil which is at the desired temperature of 325°, the efficiency created by the turbulent jet flow of the input oil dispersing pipe and baffle, as well as the high efficiency of the heater/heat exchange structure 80, prevents any substantial change in the temperature of the cooking oil. Of course, this is highly desirable in such a fast food cooking assembly.

The filter cartridge 62 is preferably of a close mesh construction to remove particles in the micron range (80-100), and thus effectively remove any crumbs and/or other contaminants from the cooking oil. Because of this filter structure, any contamination or possibility of food taste deterioration caused by undesirable flavors being transferred through the cooking oil itself is prevented. Since only a small portion (approximately 30%) of the overall oil flow passes through the filter at any time through the bypass filtering arrangement, even if the filter element should be inadvertently not changed, or otherwise become clogged up, it will not upset the operating or cooking procedures to any great degree.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A fryer assembly comprising:
 a housing;
 cooking pan means mounted within said housing for easy removal therefrom;
 a sump for a supply of cooking oil
 cooking oil dispersing means provided for said pan and connected by pump means to said cooking oil sump;

heat exchanger means in said housing for heating said cooking oil to a predetermined temperature;

thermostat control means in contact with and sensitive to the temperature of the cooking oil;

control means operably connected by writing between said thermostat control means and said heat exchanger means for electrically energizing a firing module of the latter as appropriate when a drop in cooking oil temperature occurs;

said cooking oil dispersing means including a pipe extending substantially around the entire inner circumference of said cooking pan means, with said pipe having dispersing apertures spaced therealong which are at a predetermined preset angle with respect to a lower surface of said cooking pan means to effect a substantial amount of turbulence in the flow of cooking oil into the cooking pan for obtaining a substantially constant temperature of the oil throughout the pan; and baffle means substantially covering said dispersing pipe and providing a gap between the lower edge of said baffle means and the bottom of said pan for increasing the effectiveness of the turbulent oil flow through the pan as effected by the aforesaid angled dispersing apertures in said pipe.

2. A fryer assembly as set forth in claim 1, wherein said removable cooking pan means comprises a substantially rectangular pan of fairly deep configuration for containing approximately 3 inches of heated cooking oil therein during a cooking session.

3. A fryer assembly as set forth in claim 2, wherein said cooking pan has a flange around the upper periphery thereof which in turn is provided with a reinforcing edge for supporting said pan removably within said housing.

4. A fryer assembly as set forth in claim 1, wherein said heat exchanger means includes a high efficiency gas heater for rapidly bringing oil being heated up to the desired predetermined temperature.

5. A fryer assembly as set forth in claim 4, wherein said high efficiency gas heater has structure for recirculating unburned gases within the burner thereof for further reburning, and further includes an exhaust stack which will exhaust the final combustion products at very low temperatures therefrom.

6. A fryer assembly as set forth in claim 4, wherein said thermostat control means sensitive to the cooking oil temperature includes at least one probe in the path of oil flow in the cooker assembly.

7. A fryer assembly as set forth in claim 6, wherein said at least one probe is provided for the cooking pan, and at least another probe is provided at an oil input to the heat exchanger means.

8. A fryer assembly as set forth in claim 6, wherein said control means between the thermostat control means and the heat exchanger means includes an electric controller unit, appropriate electrical wiring and temperature sensing structure.

9. A fryer assembly as set forth in claim 1, wherein said control means between the thermostat control means and the heat exchanger means includes an electric controller unit, electrical wiring, temperature sensing structure, and a temperature setting control.

10. A fryer assembly as set forth in claim 1, wherein said thermostat control means sensitive to the cooking oil temperature includes at least one probe in the path of oil flow in the cooker assembly.

11. A fryer assembly as set forth in claim 10, wherein said heat exchanger means includes a high efficiency gas heater.

12. A method of cooking food products of various types comprising the flowing steps:

effecting a flow of heated oil in a cooking apparatus;

passing a portion of said oil through a high efficiency heater for re-heating of same to a predetermined desired cooking temperature;

adding an amount of food product to be cooked to the heated oil in a cooking pan;

sensing the temperature of said oil;

heating the oil by said heater in response to said sensing step to increase the temperature of the oil to said predetermined desired cooking temperature;

swirling the heated oil being inputted into said cooking pan by forcing same through a plurality if dispersing apertures provided in a dispersing pipe extending substantially around the entire inner circumference of said cooking pan with each aperture being at a predetermined set angle relative to the bottom of said cooking pan; and further effecting turbulence of the oil being inputted so as to provide a substantially constant temperature thereof by providing baffle means over the apertures in said dispersing pipe.

13. A method as set forth in claim 12, including the further step of filtering about one-third of the oil flow in each cycle thereof.

14. A method as set forth in claim 13, including the further step of turning off the apparatus, allowing an appropriate cool down period to pass, cleaning a filter to remove any food particles and other contaminants from the cooking oil, removing and cleaning the cooking pan, and reassembly of all of the aforesaid ready for use in another cooking session.

15. A method as set forth in claim 14, wherein said oil is recycled after re-assembly and continued in use for a substantial number of days thereafter before cleaning the apparatus again.

16. A cooking fryer for fast foods comprising: a cabinet, a cooking pan removably mounted in the top of said cabinet, an oil reservoir, piping, and pump with motor mounted in said cabinet and connected together for effecting continuous flow of oil through said cooking pan during a cooking operation, a heater in series with said pump and piping for heating the oil to a desired temperature, oil dispersing means provided with said cooking pan for effecting maximum swirling action of the heated oil during cooking to eliminate any cold spots within the cooking area of said pan so fast foods will cook more efficiently, and by-pass filter means connected to said pump and piping for effectively removing any contaminants contained within said oil down to at least 80 microns in size, said oil dispersing means comprising a length of piping mounted substantially around the entire inner curcumference said cooking pan, said piping including a plurality of oil dispersing apertures set at a predetermined angle relative to the bottom of said cooking pan for effecting a turbulent flow of the cooking oil into said pan, and baffle means substantially over said length of piping for increasing the turbulence of said cooking oil flowing into said pan for achieving a desired constant temperature of the oil.

17. A cooking fryer as set forth in claim 16, wherein said filter means comprises a vertical container having a sealable cover therefor, and an insert filter of micron size trapping ability removably mounted within said container.

18. A cooking fryer as set forth in claim 17, wherein said pump comprises a contrifugal type pump for high capacity flow rates of cooking oil during operation thereof.

19. A cooking fryer as set forth in claim 18, wherein said heater is a gas energized unit incorporating structure for recycling unburned gases therethrough for further reburning prior to exhausting as low temperature output therefrom.

20. A cooking fryer as set forth in claim 19, wherein an input to said heater for the cooking oil is provided with at least one temperature probe therewith for accurately sensing the temperature of said cooking oil.

21. A cooking fryer as set forth in claim 20, wherein said oil dispersing means incorporates means for effecting a small oil flow at normally static ends thereof.

22. A cooking fryer as set forth in claim 21, wherein said oil dispersing means includes a substantially rectangular set of pipes, said means for effecting oil flow through normally static ends of the dispersing pipe includes small conical tips thereon, and a baffle structure associated with the conical tips for diverting the small oil flow therefrom outwardly into the cooking pan.

23. A cooking fryer as set forth in claim 22, together with thermostat means which is responsive to oil temperature, said thermostat means being arranged within said cabinet for easy access and adjustment by an operator.

24. A cooking fryer as set forth in claim 23, wherein at least one temperature probe is provided in the cooking pan and connected to said thermostat means.

25. A cooking fryer as set forth in claim 24, wherein at least one probe is provided in an input coupling to the heater and connected to said thermostat means.

26. A cooking fryer as set forth in claim 25, together with control means between the thermostat means and the heater.

27. A cooking fryer as set forth in claim 16, together with control means between a thermostat means and the heater.

28. A cooking fryer as set forth in claim 16, wherein at least one temperature probe is provided in an input coupling to the heater.

29. A cooking fryer as set forth in claim 16, wherein at least one probe is provided in the cooking pan and connected to thermostat control means.

30. A cooking fryer as set forth in claim 16, wherein thermostat means which is sensitive to oil temperature is provided, said thermostat means being arranged within said cabinet for easy access and adjustment by an operator.

31. A cooking fryer as set forth in claim 16, wherein an input to said heater unit for the cooking oil is provided with at least one temperature probe therewith for accurately sensing the temperature of the oil being inputted to the heater.

32. A cooking fryer as set forth in claim 16, wherein said oil dispersing means includes piping which in turn incorporates means for effecting a small oil flow at each end of the normally static ends thereof.

33. A cooking fryer as set forth in claim 32, wherein said means for effecting oil flow through the normally static ends of the dispersing pipe includes small conical tips thereon, and a baffle structure associated therewith for divering such small oil flow outwardly into the cooking pan.

34. A cooking fryer as set forth in claim 16, wherein said heater is a gas energized unit incorporating structure for recycling unburned gases therethrough for further reburning prior to exhausting at a very low temperature output therefrom.

35. A cooking fryer as set forth in claim 16, wherein said pump comprises a fluid centrifugal type pump having an input and an output for high capacity flow rates of cooking oil during operation thereof.

36. A cooking fryer as set forth in claim 18, wherein said filter means comprises a vertical container having a cover therefor, and an insert filter of small micro trapping capability removably contained within said container.

37. A cooking fryer set forth in claim 16, wherein said plurality of oil dispersing apertures set at a predetermined angle of 30°.

38. A cooking fryer set forth in claim 37, wherein said piping is in the form of a rectangle, and oil input means being connected to a midpoint thereof.

39. A cooking fryer set forth in claim 38, wherein said oil input means comprises a T-manifold connection, said T-manifold being provided with slidable engaging means for connecting same to said dispersing piping.

40. A cooking fryer set forth in claim 39, wherein said dispersing piping has two normally static ends, with means being provided therewith for permitting a small amount of oil flow through each of said ends.

41. A cooking fryer set forth in claim 40, further including a baffle between the said normally static ends for diverting said small oil flow therefrom outwardly into the center of the cooking pan.

42. A fryer assembly as set forth in claim 1, wherein said predetermined present angle of said dispersing apertures in said pipe is approximately 30°.

* * * * *